US005189329A

United States Patent [19]

Strobl

[11] Patent Number: 5,189,329

[45] Date of Patent: Feb. 23, 1993

[54] ASSEMBLED COMMUTATOR

[75] Inventor: Georg Strobl, Repulse Bay, Hong Kong

[73] Assignee: Johnson Electric S.A., La Chaus De Fonds, Switzerland

[21] Appl. No.: 689,951

[22] Filed: Apr. 24, 1991

Related U.S. Application Data

[63] Continuation of Ser. No. 412,306, Sep. 25, 1989, abandoned.

[30] Foreign Application Priority Data

Sep. 26, 1988 [GB] United Kingdom ................. 8822555

[51] Int. Cl.⁵ ............................................ H02K 13/04

[52] U.S. Cl. .................................... 310/233; 310/234; 310/236

[58] Field of Search .................. 29/597; 310/233, 234, 310/235, 236, 237

[56] References Cited

U.S. PATENT DOCUMENTS

| | | | |
|---|---|---|---|
| 1,410,914 | 3/1922 | Hartzell | 29/597 X |
| 2,256,321 | 9/1941 | McCusker | 310/235 |
| 3,223,869 | 12/1965 | Reisnecker | 29/597 X |
| 4,399,383 | 8/1983 | Kamiyama | 29/597 X |
| 4,523,374 | 6/1985 | Sawabe et al. | 29/597 |
| 4,705,977 | 11/1987 | Shibata et al. | 29/597 X |
| 4,881,000 | 11/1989 | Wang | 310/234 |
| 4,956,572 | 9/1990 | Strobl | 310/234 X |
| 5,012,149 | 4/1991 | Strobl | 310/233 X |

FOREIGN PATENT DOCUMENTS

| | | | |
|---|---|---|---|
| 0978250 | 11/1982 | U.S.S.R. | 310/233 |
| 2203292 | 10/1988 | United Kingdom | 310/234 |

*Primary Examiner*—Joseph M. Gorski
*Attorney, Agent, or Firm*—Jacobson, Price, Holman & Stern

[57] ABSTRACT

An assembled commutator comprises a cylindrical base and a plurality of segments glued on the base. To secure the segments on the base a loop, formed by stamping out a tang, is urged over a boss on the end of the base. A tongue is inserted in a recess at the other end of the base, as is known in the art. The loop pulls the segment down onto the base and also prevents circumferential movement.

1 Claim, 1 Drawing Sheet

ASSEMBLED COMMUTATOR

This is a continuation of application Ser. No. 412,306, filed Sep. 25, 1989, and now abandoned.

INTRODUCTION

The present invention relates to an assembled commutator.

BACKGROUND TO THE INVENTION

The segments of a commutator are subject to a large centrifugal force tending to lift the brush contacting portions of the segments away from the base. Typically there may be a force of 20 kg. on a segment rotating at 19,000 r.p.m.

A known commutator design has a cylindrical base with a collar at one end supporting a tang for connecting to an armature winding. A recess is provided at the junction of the collar and base and tabs on the segment extend into the recess.

SUMMARY OF THE INVENTION

The invention provides an assembled commutator comprising a base and a plurality of commutator segments mounted on the base, wherein a said segment has a tang pressed from one end thereof to leave a loop which is hooked over a boss on an end of the base to secure the segment in position, the tang being arranged for connection of the segment to an armature winding.

Preferred features and advantages of the invention will be apparent from the following description and the accompanying claims.

DESCRIPTION OF THE PREFERRED EMBODIMENTS

Figure 1:
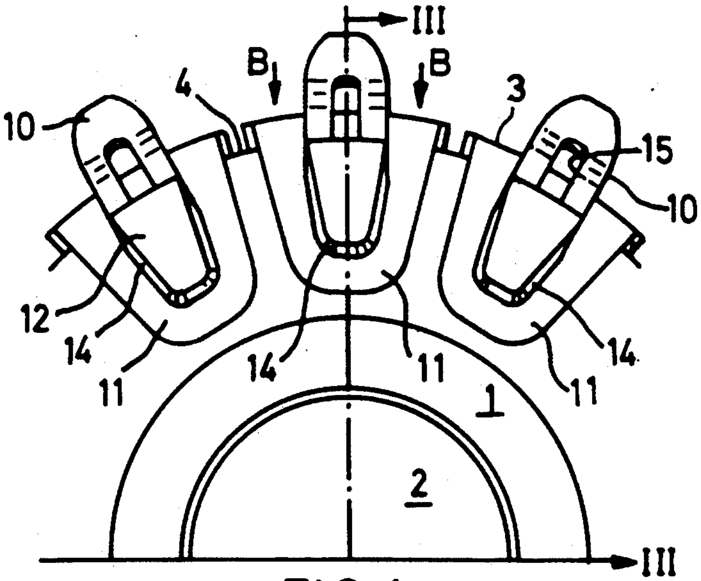
FIG. 1 is a partial end view of one embodiment of a commutator in accordance with the invention.

Referring to the drawings, an assembled commutator comprises a cylindrical base 1 of plastics material having an axial bore 2 for receiving a motor shaft (not shown). A plurality of commutator segments 3, in this example twelve, are glued on an outer cylindrical surface 4 of the base 1. The segements 3 are stamped from copper sheet and bent and folded to shape. Each segment comprises a brush contacting portion 5 having a tongue 6 at one end which is folded below the plane of the portion 5 and inserted in a recess 7 in one end 8 of the base 1. The tongue 6 has a rib 9 which forms a tight fit in the recess 7. The opposite end of the segment 3 has a tang 10 stamped in it and bent up from the plane of the portion 5. Optionally, an elongate slot 15 is stamped in the central region of the tang 10.

In use, the tang 10 is connected to an armature winding wire by hot forging, an electrode bearing down on the tang 10 (arrow A) and on the segment at either side of the tang (arrow B).

When the tang 10 is bent up it leaves a loop 11 at the end of the segment which is folded down to lock over a boss 12 on the end 13 of the base 1. The loop 11 is a tight fit about the boss 12 which is chamfered at its edges 14 to allow the loop to be forced over the boss.

Figure 2:
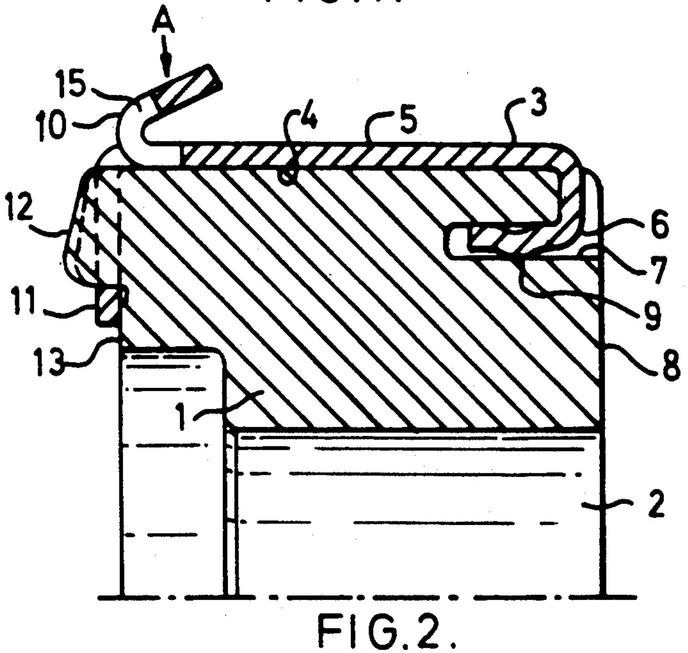
FIG. 2 is a cross-section along the line II—II of FIG. 1.
Figure 3:
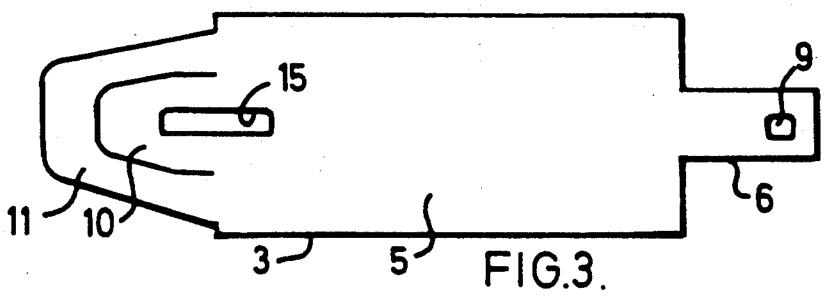
FIG. 3 shows a blank for a commutator segment of commutator of FIG. 1.

To assemble the commutator, the segments are stamped and the tongue 6 and tang 10 folded as seen in FIG. 2. The brush contacting portion 5 is bent to sit snugly on the base 1. A layer of glue is placed on the surface 4 of the base 1 and/or the underside of the segments 3. The segments are slid onto the base, the tongues 6 being urged into the recesses 7. The loops 11 are then folded and pressed over the bosses 2.

The loops 11 serve to pull the segments down onto the base 1 and also to prevent circumferential movement of the segments on the base.

Various modifications may be made to the invention and it is desired to include all such modifications as fall within the scope of the accompanying claims.

What is claimed is:

1. An assembled commutator comprising a cylindrical base having a plurality of bosses at one end and a plurality of commutator segments mounted on the base, wherein each segment comprises a longitudinal body radially separated from a longitudinal axis of the base, the body having a first and second end, the body being integrally formed on the first end with a tang arranged for coupling the segment to an armature winding and with a closed loop which is looped around a respective boss, wherein the loop extends radially inwardly of the body of the segment and the tang extends radially outwardly of the body of the segment.

* * * * *